United States Patent
Tertinek et al.

(10) Patent No.: US 11,942,984 B2
(45) Date of Patent: Mar. 26, 2024

(54) COMMUNICATION DEVICE AND OPERATING METHOD

(71) Applicant: NXP B.V., Eindhoven (NL)

(72) Inventors: Stefan Tertinek, Graz (AT); Raf Lodewijk Jan Roovers, Wommelgem (BE)

(73) Assignee: NXP B.V., Eindhoven (NL)

( * ) Notice: Subject to any disclaimer, the term of this patent is extended or adjusted under 35 U.S.C. 154(b) by 138 days.

(21) Appl. No.: 17/651,830

(22) Filed: Feb. 21, 2022

(65) Prior Publication Data

US 2022/0271793 A1  Aug. 25, 2022

(30) Foreign Application Priority Data

Feb. 23, 2021 (EP) .................................. 21158577

(51) Int. Cl.
*H04B 1/717* (2011.01)
*H04B 1/7183* (2011.01)
*H04L 1/00* (2006.01)

(52) U.S. Cl.
CPC ......... *H04B 1/7172* (2013.01); *H04B 1/7183* (2013.01); *H04L 1/0025* (2013.01)

(58) Field of Classification Search
CPC .... H04B 1/7172; H04B 1/7183; H04L 1/0025
See application file for complete search history.

(56) References Cited

U.S. PATENT DOCUMENTS

| | | | |
|---|---|---|---|
| 5,220,683 A * | 6/1993 | Rudish | H04B 1/0092 |
| 2008/0170559 A1 | 7/2008 | Zumsteg | |
| 2008/0204322 A1 | 8/2008 | Oswald et al. | |
| 2018/0128898 A1* | 5/2018 | Seler | G01S 7/006 |
| 2019/0187250 A1* | 6/2019 | Ru | G01S 7/4052 |
| 2020/0106877 A1 | 4/2020 | Ledvina et al. | |
| 2022/0206135 A1* | 6/2022 | Lee | G01S 7/415 |

OTHER PUBLICATIONS

Corbalan, P., "Ultra-wideband Concurrent Ranging", ACM Trans. Sensor Netw., vol. 1, No. 1, Article 1. Publication date: Jan. 2020.
Dotlic, I., "Angle of Arrival Estimation Using Decawave DW1000 Integrated Circuits", 2017 14th Workshop on Positioning, Navigation and Communications (WPNC), Oct. 25-26, 2017.

* cited by examiner

*Primary Examiner* — Ronald B Abelson

(57) ABSTRACT

In accordance with a first aspect of the present disclosure, a communication device is provided, comprising: an ultra-wideband (UWB) transceiver configured to communicate with an external communication device; a processing unit configured to switch the UWB transceiver between different transceiver modes of operation while the UWB transceiver receives or transmits a data frame; wherein the different transceiver modes of operation include a ranging mode, an angle-of-arrival (AoA) mode and/or a radar mode. In accordance with a second aspect of the present disclosure, a corresponding method of operating a communication device is conceived. In accordance with a third aspect of the present disclosure, a corresponding computer program is provided.

20 Claims, 5 Drawing Sheets

COMMUNICATION DEVICE AND OPERATING METHOD

CROSS-REFERENCE TO RELATED APPLICATIONS

This application claims the priority under 35 U.S.C. § 119 of European Patent application no. 21158577.3, filed on 23 Feb. 2021, the contents of which are incorporated by reference herein.

TECHNICAL FIELD

The present disclosure relates to a communication device. Furthermore, the present disclosure relates to a corresponding method of operating a communication device, and to a corresponding computer program.

BACKGROUND

Ultra-wideband (UWB) is a technology that uses a high signal bandwidth, in particular for transmitting digital data over a wide spectrum of frequency bands with very low power. For example, UWB signals of at least 500 MHz wide are allowed by spectrum regulators in the 3.1-10.6 GHz frequency spectrum. In particular, UWB technology may use very short pulse signals and is potentially capable of supporting high data rates. The UWB technology enables a high data throughput for communication devices and a high precision for the localization of devices. In particular, UWB technology may be used for so-called ranging operations, i.e., for determining the distance between communicating devices.

SUMMARY

In accordance with a first aspect of the present disclosure, a communication device is provided, comprising: an ultra-wideband (UWB) transceiver configured to communicate with an external communication device; a processing unit configured to switch the UWB transceiver between different transceiver modes of operation while the UWB transceiver receives or transmits a data frame; wherein the different transceiver modes of operation include a ranging mode, an angle-of-arrival (AoA) mode and/or a radar mode.

In one or more embodiments, the data frame includes one or more data sequences which are specifically suited for use in operations performed when the UWB transceiver operates in one of said plurality of different transceiver modes.

In one or more embodiments, said data frame further includes time gaps between said data sequences, and/or the data sequences have different lengths.

In one or more embodiments, the processing unit is further configured to assign the data sequences to specific antennas within a set of antennas included in the communication device, and/or the processing unit is further configured to assign the data sequences to specific transmission or receiving functions of the communication device.

In one or more embodiments, the processing unit is further configured to change a power level for one or more of said data sequences.

In one or more embodiments, the processing unit is further configured to cause a change of pulse shape of a signal carrying the data frame while said data frame is being received or transmitted.

In one or more embodiments, the processing unit is further configured to perform a correlation operation on the data frame before a binning operation on said data frame when the UWB transceiver operates in the ranging mode or the AoA mode.

In one or more embodiments, the processing unit is further configured to perform a binning operation on the data frame before a correlation operation on said data frame when the UWB transceiver operates in the radar mode.

In one or more embodiments, the processing unit is further configured to include synchronization information in said data frame when the UWB transceiver operates in the radar mode.

In one or more embodiments, the processing unit is further configured to initialize the UWB transceiver for use in the radar mode, in particular by using previously obtained configuration data.

In one or more embodiments, an access system, in particular a vehicle access system, comprises a communication device of the kind set forth.

In one or more embodiments, a bi-static radar system comprises a communication device of the kind set forth, wherein said communication device is configured to act as an initiator, the system further comprising a plurality of responders, wherein each of said responders comprises a transceiver configured to operate in a predefined sequence of modes of operation, in particular a predefined sequence which is configured by the communication device.

In one or more embodiments, the responders are configured to toggle between a ranging mode and a radar mode in a time-multiplexed manner.

In accordance with a second aspect of the present disclosure, a method of operating a communication device is conceived, the method comprising: communicating, by an ultra-wideband, UWB, transceiver comprised in the communication device, with an external communication device; switching, by a processing unit comprised in the communication device, the UWB transceiver between different transceiver modes of operation while the UWB transceiver receives or transmits a data frame; wherein the different transceiver modes of operation include a ranging mode, an angle-of-arrival (AoA) mode and/or a radar mode.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings, in which.

DESCRIPTION OF EMBODIMENTS

Figure 2:
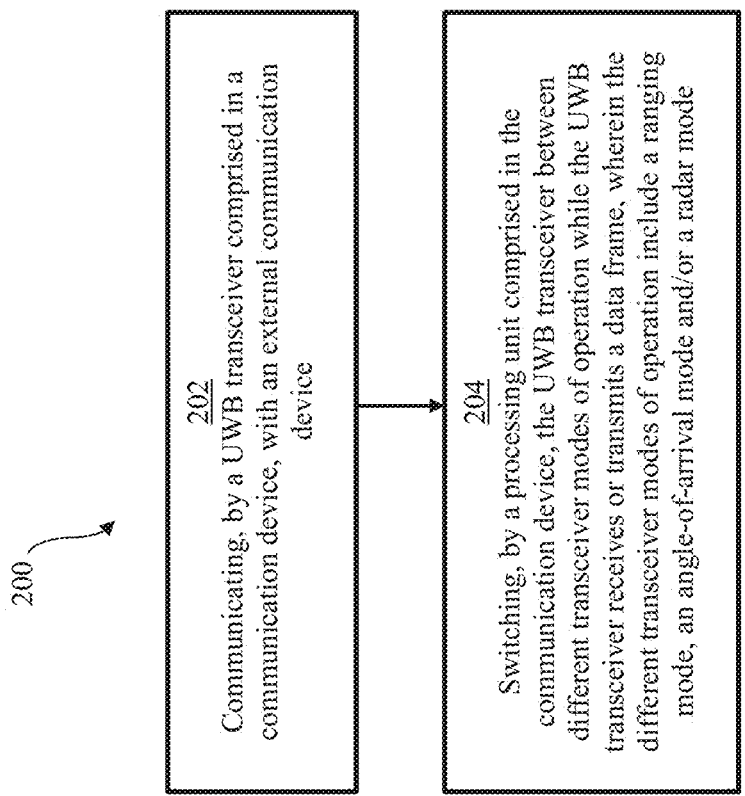
FIG. 2 shows an illustrative embodiment of a method of operating a communication device.

As mentioned above, ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range, velocity, and/or angle relative to the other smart device. In order to measure these parameters, UWB transceivers may operate in different modes of operation, such as a ranging mode, an angle-of-arrival (AoA) mode and a radar mode.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two phase values, and an AoA is calculated based on the PDoA. In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The skilled person will appreciate that these are non-limiting examples of how the different modes of operation can be implemented. In other words, the modes may be implemented differently, depending on the requirements imposed by the application, for example.

Each of these technologies have their own advantages in terms of how accurately the range, velocity, and/or angle of a user's smart device (e.g. key fob) relative to another smart device (e.g., a car anchor) can be determined. For instance, compared to the AoA mode and the radar mode, the ranging mode offers a high accuracy of the measured distance (i.e., of the range). In particular, the AoA mode would only enable a distance resolution if many anchors are used, unless range information is taken into account as well. However, compared to the radar mode, the ranging mode offers only a low accuracy of the velocity measurement, and the AoA mode does not enable a velocity measurement at all. Furthermore, compared to the ranging mode and the radar mode, the AoA mode offers a high accuracy of the angle measurement. In particular, for achieving an angular resolution in the radar mode, many antennas would have to be used. Furthermore, the ranging mode would only enable an angle measurement if multiple anchors are used. Accordingly, since a UWB transceiver typically operates in one of these modes, a sufficiently accurate measurement of all the parameters (i.e., range, velocity and angle) may not be possible.

Now a communication device and a corresponding method of operating a communication device will be discussed, which facilitate achieving a sufficiently accurate measurement of the range, velocity and angle of said device relative to an external communication device.

Figure 1:
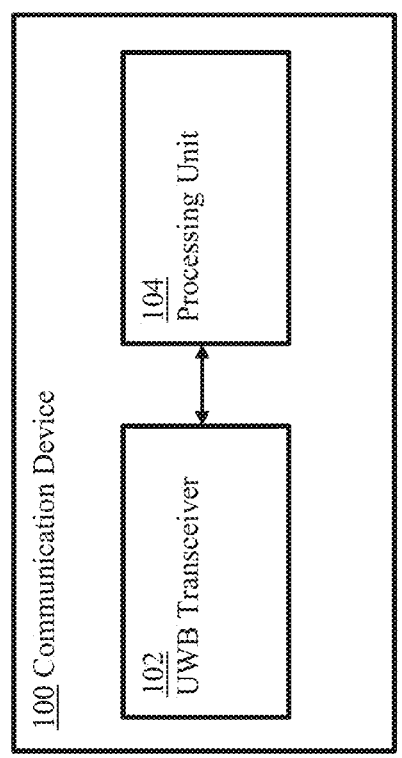
FIG. 1 shows an illustrative embodiment of a communication device.

FIG. 1 shows an illustrative embodiment of a communication device 100. The communication device 100 comprises an UWB transceiver 102 and a processing unit 104. The UWB transceiver 102 is configured to communicate with an external communication device (not shown), which is also UWB-enabled. Furthermore, the processing unit 104 is configured to switch the UWB transceiver 102 between different transceiver modes of operation while the UWB transceiver 102 receives or transmits a data frame. In particular, the different transceiver modes of operation include a ranging mode, an AoA mode and/or a radar mode. By switching the UWB transceiver 102 between these modes while it receives or transmits a data frame, a sufficiently accurate measurement of the range, velocity and angle of the communication device 100 relative to the external communication device can be achieved, because the advantages of each of these modes can be exploited. More specifically, ranging, AoA and/or radar operations may be carried out using the same UWB frame exchanged between smart devices, thereby achieving a high accuracy of the measured distance, velocity and angle using a minimal energy or power consumption as well as minimizing the channel occupancy. It is noted that, although the UWB transceiver 102 and the processing unit 104 are shown as functionally separate units, they may be combined in single physical component of the communication device 100.

In one or more embodiments, the data frame includes one or more data sequences which are specifically suited for use in operations performed when the UWB transceiver operates in one of said plurality of different transceiver modes. In this way, the operation of the UWB transceiver in the specific mode for which the data sequence is suited may be facilitated. In particular, data sequences may be specifically suited for use in a particular transceiver mode in the sense that their contents can be processed by the transceiver or operated on by the transceiver when the transceiver operates in said particular mode. In one or more embodiments, the data frame further includes time gaps between said data sequences. In this way, the UWB transceiver may be given enough time to switch to the desired mode of operation. This, in turn, increase the reliability of the transceiver's operation. Furthermore, in one or more embodiments, the data sequences have different lengths. In this way, the performance of the communication device may be increased. For instance, longer data sequences may be used for an improved radar signal-to-noise ratio (SNR). In one or more embodiments, the processing unit is further configured to assign the data sequences to specific antennas within a set of antennas included in the communication device. In this way, specific antennas may be used for the particular modes. For instance, when the UWB transceiver operates a radar mode, a different antenna may be used than when the UWB transceiver operates in the ranging mode or the AoA mode. Furthermore, in one or more embodiments, the processing unit is further configured to assign the data sequences to specific transmission or receiving functions of the communication device. In this way, specific functions may be used for the particular modes. For instance, a radar mode operation may be performed on one receiver followed by a ranging operation on a second receiver, with the first receiver operating in a first receiver mode and the second receiver in a second receiver mode. In one or more embodiments, the processing unit is further configured to change a power level for one or more of said data sequences. In this way, the power consumption of the communication device may be reduced. For instance, the power for radar mode operations may be reduced when a user is close to a vehicle. In a practical implementation, the power level that is changed may be the transmit power.

In one or more embodiments, the processing unit is further configured to cause a change of pulse shape of a signal carrying the data frame while said data frame is being received or transmitted. In this way, the pulse shape may be optimized, for instance, to increase the sensitivity of the UWB transceiver when it operates in the ranging mode, such that the time of arrival of messages can be estimated with increased accuracy. Alternatively, the pulse shape may be optimized to increase the radar SNR when the UWB transceiver operates in the radar mode. In one or more embodiments, the processing unit is further configured to perform a correlation operation on the data frame before a binning operation on said data frame when the UWB transceiver operates in the ranging mode or the AoA mode. In this way, the likelihood of a correct operation in the ranging mode or the AoA mode may be increased. In one or more embodiments, the processing unit is further configured to perform a binning operation on the data frame before a correlation operation on said data frame when the UWB transceiver operates in the radar mode. In this way, the complexity of the required hardware may be reduced. In the ranging mode, the received signal originates from the transmitter of another device. Since it is not known when the other device starts transmitting, the correlation should be performed first to determine that the received signal is a valid signal (i.e., that it has a high correlation peak). However, in the radar mode the binning can be performed first, because the received signal originates from the transmitter on the same device and therefore it is known when it has been transmitted. Thus, the binning can be performed straight away with the full analog-to-digital convertor (ADC) resolution, thereby improving the SNR.

It is noted that a data frame, in particular the SYNC part, consists of a repetition of multiple symbols (for example, 512 symbols). Each symbol consists of a sequence of pulses (for example, 127 pulses), where a positive pulse represents the bit +1 and a negative pulse the bit −1. A sequence may be obtained from a specific known code (for example, +1, +1, −1, +1, −1, ... etc.). Binning means that the symbols are averaged (binned), in the sense that the first pulses of each symbol are averaged (i.e., put into the same bin), and the second pulses are averaged as well. Thus, the 512 symbols may be averaged down to 1 "average symbol", thereby reducing noise. Correlation means that the resulting average symbol, which consists of the series of pulses, is correlated against a predefined pulse sequence, for example against the known code (say +1, +1, −1, +1, −1, ... etc.) in the example given above. If the sequence of pulses in a received data frame was generated based on the known code, then the correlation will contain a maximum or peak (high correlation); similarly, the correlation will contain no peak (low correlation) if the data frame was generated based on a different code. Since correlation and binning are linear operations, they can easily be interchanged, in the sense that each one of them can precede the other one.

In one or more embodiments, the processing unit is further configured to include synchronization information in said data frame when the UWB transceiver operates in the radar mode. In this way, multiple radar devices may be synchronized more easily. Said multiple radar devices may be anchors that can operate in a radar mode, in addition to the ranging mode and the AoA mode. For example, in a child presence detection application, multiple synchronized anchors inside a vehicle (e.g., in the front and back) may be used to detect a breathing child. In one or more embodiments, the processing unit is further configured to initialize the UWB transceiver for use in the radar mode, such that the latter may operate in said radar mode. In a practical implementation, the processing unit is configured to initialize the UWB transceiver using previously obtained configuration data. In this way, the initialization of the UWB transceiver is facilitated.

In one or more embodiments, a bi-static radar system comprises a communication device of the kind set forth. In those embodiments, the communication device is configured to act as an initiator, and the system further comprises a plurality of responders, wherein each of said responders comprises a transceiver configured to operate in a predefined sequence of modes of operation. In this way, a UWB-based bi-static radar system can easily be implemented. Furthermore, the predefined sequence of modes of operation in which the transceivers of the responder can operate may be configured by the communication device acting as an initiator. In this way, said predefined sequence can easily be configured, which in turn facilitates properly tuning the bi-static radar system. In a practical implementation of the system, the responders are configured to toggle between a ranging mode and a radar mode in a time-multiplexed manner.

FIG. 2 shows an illustrative embodiment of a method 200 of operating a communication device. The method 200 comprises the following steps. At 202, a UWB transceiver comprised in a communication device communicates with an external communication device. Furthermore, at 204, a processing unit comprised in the communication device switches the UWB transceiver between different transceiver modes of operation while the UWB transceiver receives or transmits a data frame. In particular, the different transceiver modes of operation include a ranging mode, an AoA mode and/or a radar mode. The method 200 facilitates achieving a sufficiently accurate measurement of the range, velocity and angle of the communication device relative to an external communication device.

UWB-enabled communication devices may act as an initiator in a communication session, or as a responder. More specifically, an initiator is configured to initiate the communication with another communication device, and if the latter device responds to the initiator, then it is acting as a responder. Thus, the presently disclosed communication device may either be an initiator or a responder in a communication session. Accordingly, the mode of operation of a UWB transceiver of an initiator or a responder (or both) may be changed between a ranging mode, an AoA mode and/or a radar mode during any part of the frame which is exchanged between the initiator and the responder. The addition of the radar mode to the ranging mode and the AoA mode may effectively be supported by making the hardware reconfigurable, in particular by interchanging the binning and correlation operation within a data frame.

The different modes of operation of the UWB transceiver may have the following properties. In the ranging mode, either the transmitter (TX) or the receiver (RX) of the UWB transceiver is active. Furthermore, a correlation operation is performed before a binning operation. Also, in the ranging mode, a single fixed antenna may be used for the communication. In the AoA mode, either the TX or RX is active. Furthermore, the correlation operation is performed before the binning operation. Also, in the AoA mode, the antenna used for the communication may be switched. In the radar mode, both the TX and RX are simultaneously active. Furthermore, a self-interference cancellation (SIC) function of the TX may be active. Furthermore, the binning operation is performed before the correlation operation, in order to achieve a higher signal-to-noise ratio. Also, in the radar mode, the antenna used for the communication may be switched. By using such a reconfigurable hardware a cost-effective solution may be realized.

Figure 3:
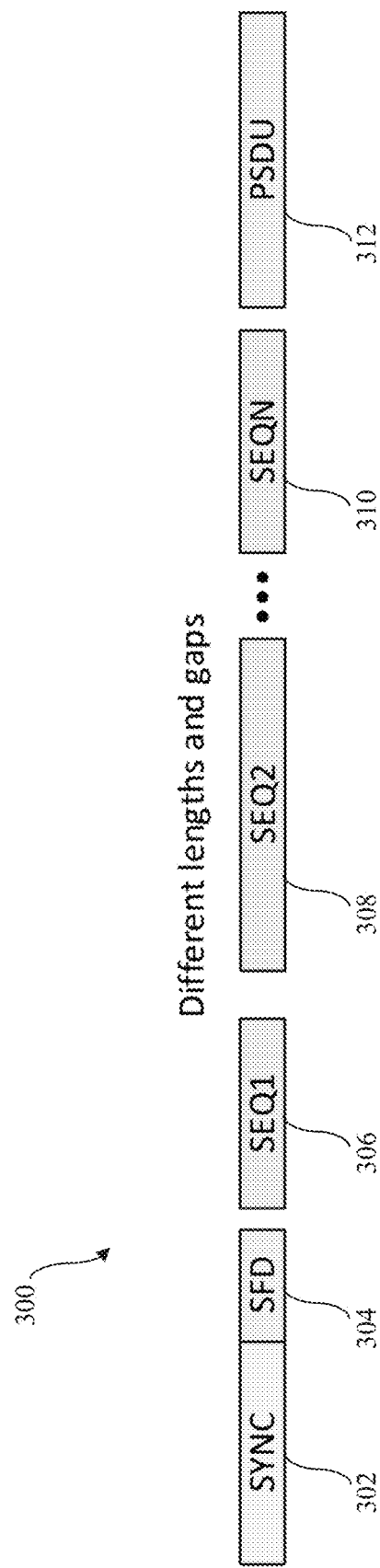
FIG. 3 shows an illustrative embodiment of a data frame.

FIG. 3 shows an illustrative embodiment of a data frame 300. In particular, to facilitate switching the UWB transceiver between the different modes of operation, the data frame 300 may have a predefined structure as shown in FIG. 3. The data frame 300 includes a synchronization (SYNC) pattern 302, start-of-frame (SFD) delimiter 304, a plurality of data sequences 306, 308, 310 and a physical layer (PHY) service data unit (PSDU) 312. It is noted that the IEEE 802.15.4 standard already defines the SYNC pattern 302, the SFD 304 and the PSDU 312. The plurality of data sequences SEQ1, . . . N, 306, 308, 310 are inserted to facilitate switching the UWB transceiver between the different modes of operation. Each of said data sequences SEQ1, . . . N, 306, 308, 310 is specifically suited for use in operations performed when the UWB transceiver operates in one of said modes. For instance, these sequences may include a pseudo-random scrambled timestamp sequence (STS) as currently defined in the standard IEEE 802.15.4, periodic radar SYNC sequences which are specific to the radar mode, to improve system performance parameters such as the SNR and the velocity resolution. In the latter case, an IEEE SYNC frame with 1024 symbols would be a suitable implementation. The skilled person will appreciate that different techniques may be applied for triggering the processing unit to switch the UWB transceiver to another mode. For instance, a data word may be added at the end of each SEQ, based on which the particular mode for the next SEQ is selected. Alternatively, the device may be configured with a sequence of modes, including the duration of each SEQ, before the UWB session is started.

It is noted that time gaps may be provided between the sequences, such that the UWB transceiver can be reconfigured to the desired mode. Alternatively, some sequences may be skipped during a frame exchange, such that the UWB transceiver has enough time to switch to another mode. Furthermore, the sequences may have varying lengths, so that system performance can be optimized. For instance, longer sequences may be used in order to improve the radar SNR. Furthermore, arbitrary sequences may be assigned to specific antennas. For example, a designated antenna may be used for the radar mode, which is different from the antenna used for the ranging mode and the AoA mode. In addition, the pulse shape may be changed during operation. For instance, the pulse shape may be changed in such a way that the time of arrival of messages can be estimated with increased accuracy in the ranging mode. Alternatively, as mentioned above, the pulse shape may be optimized to increase the radar SNR when the UWB transceiver operates in the radar mode.

Now some examples will be described, which are based on the single-sided two-way ranging (SS-TWR) method. It is noted that the ranging mode is not limited to single-sided two-way ranging. The skilled person will appreciate that the ranging mode may also use the doubled-sided two-way ranging (DS-TWR) method, for example. The examples show details of the data frame content as well as the reconfiguration of the respective transmitters and receiver.

Figure 4:
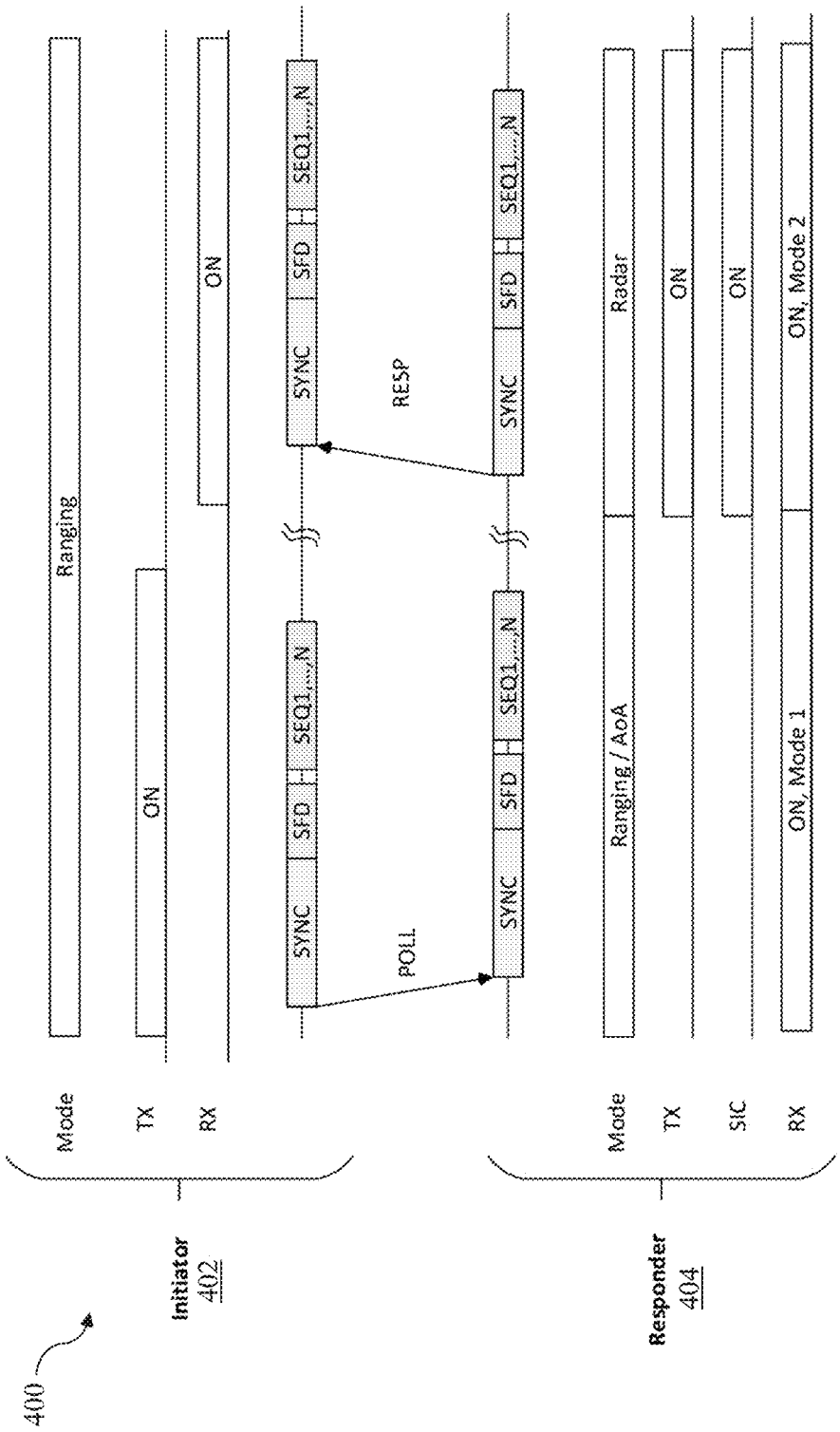
FIG. 4 shows an illustrative embodiment of a transceiver reconfiguration.

FIG. 4 shows an illustrative embodiment of a transceiver reconfiguration 400. In this embodiment, both an initiator 402 and a responder 404 contain a transceiver chip which can be configured or reconfigured to operate in predefined transceiver modes of operation. In particular, it is shown how the ranging mode, AoA mode and radar mode can be used during a UWB frame exchange between the initiator 402 and the responder 404. The initiator 402 may be a smart key fob and the responder 404 may be a car anchor, for example. First, the initiator 402 transmits a POLL frame. When doing so, the transceiver chip of the initiator 402 is configured to operate in the ranging mode. In this example, the operation in the ranging mode means that the transmission function of the chip is ON in order to transmit the POLL frame, and that its receiver function is OFF. Subsequently, the responder 404 receives the POLL frame transmitted by the initiator 402. When doing so, its transceiver chip is configured to operate in the ranging mode and/or the AoA mode. In this example, this means that the transmission function of the chip is OFF, and that its receiver function is configured to operate in a first receiver mode (the details of which are described below). It is noted that the receiver function may compute the AoA. Next, the responder 404 transmits a response (RESP) frame. When doing so, its transceiver chip is configured to operate in the radar mode. In this example, this means that the transmission function (TX) of the chip is ON in order to transmit the RESP frame, and that its receiver function is ON to receive the reflection of the data sequences SEQ1, . . . , N. Furthermore, it means that the receiver function is configured to operate in a second receiver mode (the details of which are described below), and that the SIC function may be ON to cancel its own TX during reception. Finally, the initiator 402 receives the RESP frame transmitted by responder 404. When doing so, its transceiver chip is still configured to operate in the ranging mode. During reception of a frame, the operation in the ranging mode means that the transmission function of the chip is OFF and that its receiver function is ON in order to receive the frame, wherein the data sequences SEQ1, . . . , N are ignored. It is noted that the PSDU shown in FIG. 3 is not shown in FIG. 4 for the sake of simplicity, but it would be transmitted in the RESP frame as the PSDU contains the timestamps needed for the range determination. Thus, the RX within initiator 402 would only ignore SEQ1, . . . N but not the PSDU. Furthermore, it is noted that in case of secure ranging, SEQ1 is an STS which is processed by the initiator 402.

Figure 5:
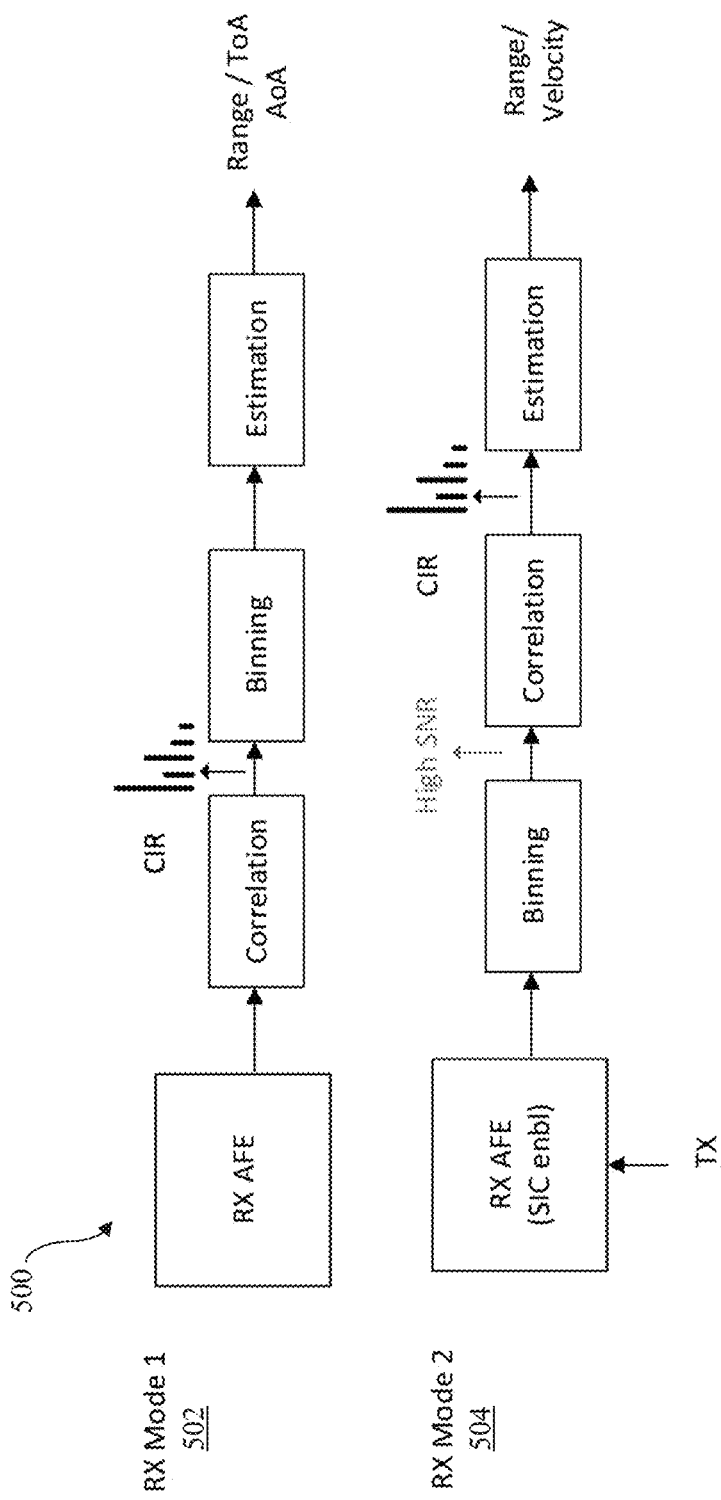
FIG. 5 shows illustrative embodiments of receiver modes of operation.

FIG. 5 shows illustrative embodiments of receiver modes of operation 500. As mentioned above, the receiver function of a transceiver may be configured to operate in a first receiver mode 502 and in a second receiver mode 504. In the first receiver mode 502, a correlation operation is performed on the output of an analog front-end (AFE) before a binning operation, to allow frame acquisition. For example, only a few bits output by an analog-to-digital converter included in said AFE may be used for the correlation, in order to save power. In the second receiver mode 504, a binning operation is performed before a correlation operation. This typically consumes more power, but the signal-to-noise ratio can be increased. Furthermore, the correlation can be performed by a digital signal processor (DSP) to reduce the hardware complexity. It is noted that a full-bit correlator would be area-consuming.

Figure 6:
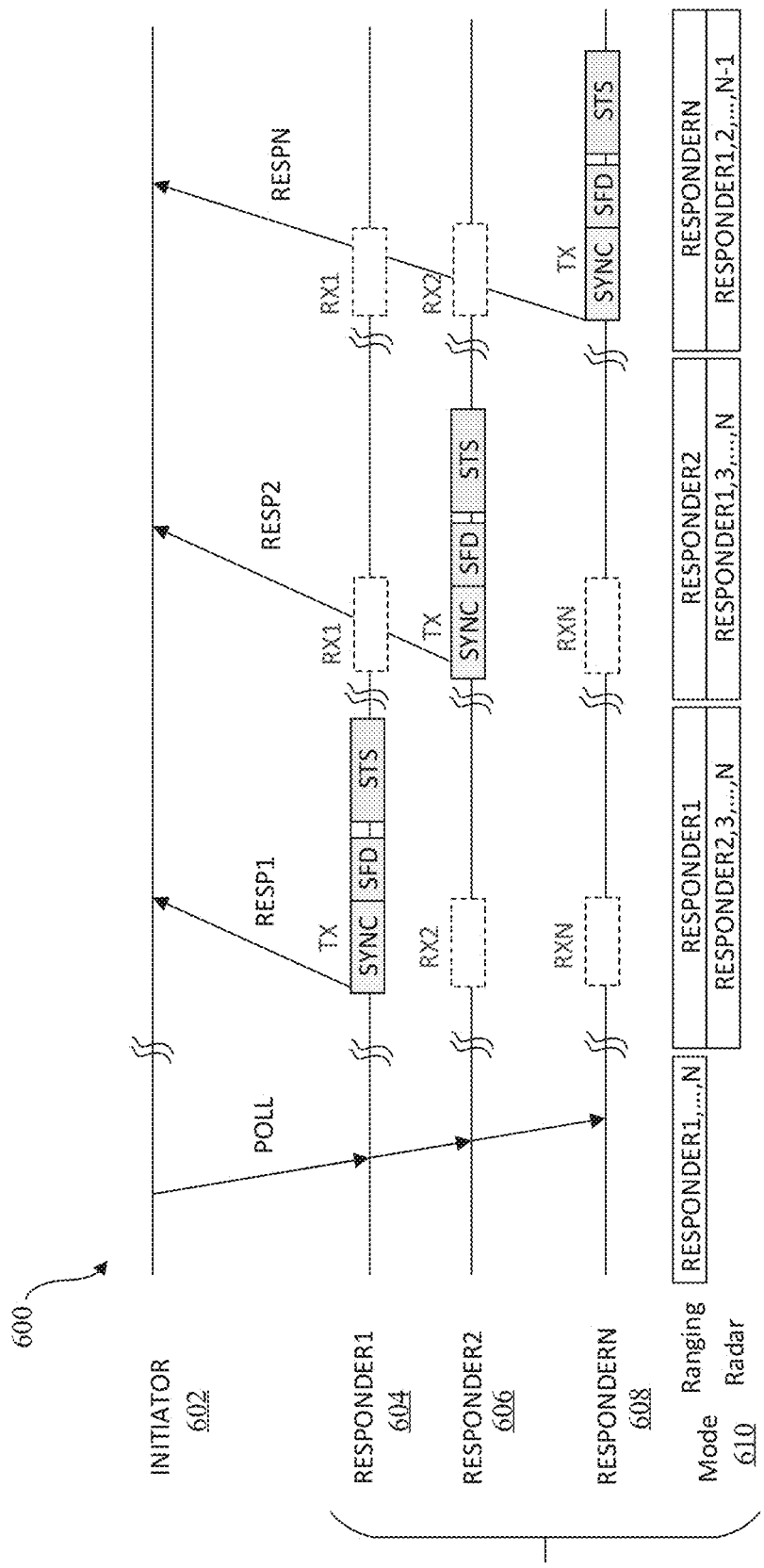
FIG. 6 shows an illustrative embodiment of a bi-static radar operation with multiple responders.

FIG. 6 shows an illustrative embodiment of a bi-static radar operation 600 with multiple responders. In a bi-static radar operation, the transmitter and receiver are physically separated by a sufficient distance. For instance, vehicle anchors may operate in a bi-static mode, with one anchor operating in a TX mode and the other operating in a RX mode. In particular, in this embodiment, an initiator 602 communicates with a plurality of responders 604, 606, 608. The transceivers of the respective responders 604, 606, 608 operate in a predefined sequence of modes of operation 610 which may be configured by the initiator 602. In particular, it is shown how a bi-static radar operation with multiple responders can work using only one SS-TWR frame exchange. The initial transmission of a POLL frame and its reception by a single responder has been explained with reference to FIG. 4. In this example, the POLL frame is received by multiple responders 604, 606, 608. The responders 604, 606, 608 would normally respond in a time-multiplexed manner, which would be configured in advance by the initiator 602.

More specifically, in the embodiment shown in FIG. 6, the responders 604, 606, 608 toggle between a ranging mode and a radar mode in a time-multiplexed manner, and the SYNC part of the frame is used for radar. Initially, RESPONDER1 604 operates in the ranging mode with its TX sending back a frame (SYNC, SFD, STS etc.) to the initiator 602, and its RX is OFF. Furthermore, RESPONDER2, ..., N 606, 608 operate in the radar mode, and the corresponding receivers RX2, ..., N receive the SYNC part of RESPONDER1 604 which is reflected by a target object, while the corresponding transmitters TX2, ..., N are OFF. Next, RESPONDER2 606 operates in the ranging mode while RESPONDER1, 3, ..., N 604, 608 operate in the radar mode, with the former sending back its frame to the initiator 602 and the latter receiving the SYNC part as reflected by the target object. This process is repeated for each of the N responders. It is noted that the order of responding in the ranging mode may be different from the above-described order. For example, RESPONDER2 606 may be the first responder that operates in the ranging mode. Furthermore, not all responders need to be switched into the radar mode at any particular time. For example, the RX of RESPONDERN 608 may only listen to TX of RESPONDER1 604, but not of the other responders. Furthermore, it is noted that the initiator 602 may ignore the sequence SEQ and merely sequentially receive the frames RESP1-N. Furthermore, it is noted that this scheme may be extended to cover any combination of responders transmitting and receiving the radar SEQ (for example, also to a multi-static radar operation). It is noted that the PSDU shown in FIG. 3 is not shown in FIG. 6 for the sake of simplicity, but it would be transmitted in the RESP1, RESP2, RESPN frames as the PSDU contains the timestamps needed for the range determination.

As mentioned above, the processing unit may be configured to include synchronization information in the data frame when the UWB transceiver operates in the radar mode. In this way, multiple radar devices may be synchronized more easily. For example, the XO oscillators (i.e., clocks) and carrier frequency offset of multiple radar devices may be synchronized using a current radar frame or a preceding ranging or radar frame. Furthermore, the processing unit may be configured to initialize the UWB transceiver for use in the radar mode, in particular by using previously obtained configuration data. In this way, the initialization of the UWB transceiver is facilitated. For example, when a radar operation is executed within a frame exchange, the radar configuration (e.g., the number of symbols) may be shared beforehand via a controller area network (CAN bus) or via the initiator, which would then act as a master.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 UWB transceiver
104 processing unit
200 method of operating a communication device
202 communicating, by a UWB transceiver comprised in a communication device, with an external communication device
204 causing, by a processing unit comprised in the communication device, the UWB transceiver to switch between different transceiver modes of operation while the UWB transceiver receives or transmits a data frame, wherein the different transceiver modes of operation include a ranging mode, an angle of arrival mode and/or a radar mode
300 data frame
302 synchronization (SYNC) pattern
304 start-of-frame delimiter (SFD)
306 sequence 1
308 sequence 2
310 sequence N
312 PHY service data unit (PSDU)
400 transceiver reconfiguration
402 initiator
404 responder
500 receiver modes of operation
502 receiver mode 1
504 receiver mode 2
600 bi-static radar operation with multiple responders
602 initiator
604 responder 1
606 responder 2
608 responder N
610 transceiver mode of operation

The invention claimed is:

1. A bi-static radar system comprising:
a communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar model;
wherein said communication device is configured to act as an initiator;
a plurality of responders, wherein each of said responders comprises a transceiver configured to operate in a predefined sequence of modes of operation, in particular a predefined sequence which is configured by the communication device.

2. The communication device of claim 1,
wherein the processing unit is further configured to cause a change of pulse shape of a signal carrying the data frame while said data frame is being received or transmitted.

3. An access system, in particular a vehicle access system, comprising the communication device of claim 1.

4. The system of claim 1, wherein the responders are configured to toggle between a ranging mode and a radar mode in a time-multiplexed manner.

5. A communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the data frame includes one or more data sequences which are specifically suited for use in operations performed when the UWB transceiver operates in one of the different transceiver modes.

6. The communication device of claim 5, wherein said data frame further includes time gaps between said data sequences, and/or wherein the data sequences have different lengths.

7. The communication device of claim 5, wherein the processing unit is further configured to assign the data sequences to specific antennas within a set of antennas included in the communication device, and/or wherein the processing unit is further configured to assign the data sequences to specific transmission or receiving functions of the communication device.

8. The communication device of claim 5, wherein the processing unit is further configured to change a power level for one or more of said data sequences.

9. A bi-static radar system comprising the communication device of claim 5, wherein said communication device is configured to act as an initiator, the system further comprising a plurality of responders, wherein each of said responders comprises a transceiver configured to operate in a predefined sequence of modes of operation, in particular a predefined sequence which is configured by the communication device.

10. The communication device of claim 5, wherein the processing unit is further configured to cause a change of pulse shape of a signal carrying the data frame while said data frame is being received or transmitted.

11. The communication device of claim 5, wherein the processing unit is further configured to perform a correlation operation on the data frame before a binning operation on said data frame when the UWB transceiver operates in the ranging mode or the AoA mode.

12. The communication device of claim 5, wherein the processing unit is further configured to perform a binning operation on the data frame before a correlation operation on said data frame when the UWB transceiver operates in the radar mode.

13. The communication device of claim 5, wherein the processing unit is further configured to include synchronization information in said data frame when the UWB transceiver operates in the radar mode.

14. The communication device of claim 5, wherein the processing unit is further configured to initialize the UWB transceiver for use in the radar mode, in particular by using previously obtained configuration data.

15. An access system, in particular a vehicle access system, comprising the communication device of claim 5.

16. A communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the processing unit is further configured to perform a correlation operation on the data frame before a binning operation on said data frame when the UWB transceiver operates in the ranging mode or the AoA mode.

17. A communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the processing unit is further configured to perform a binning operation on the data frame before a correlation operation on said data frame when the UWB transceiver operates in the radar mode.

18. A communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the processing unit is further configured to include synchronization information in said data frame when the UWB transceiver operates in the radar mode.

19. A communication device, comprising:
an ultra-wideband, UWB, transceiver configured to communicate with an external communication device;
a processing unit configured to switch the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the processing unit is further configured to initialize the UWB transceiver for use in the radar mode, in particular by using previously obtained configuration data.

20. A method of operating a communication device, the method comprising:
communicating, by an ultra-wideband, UWB, transceiver comprised in the communication device, with an external communication device;
switching, by a processing unit comprised in the communication device, the UWB transceiver between different transceiver modes of operation while the UWB transceiver receives or transmits a data frame;
wherein the different transceiver modes of operation include a ranging mode, an angle-of-arrival, AoA, mode and/or a radar mode;
wherein the data frame includes one or more data sequences which are specifically suited for use in operations performed when the UWB transceiver operates in one of the different transceiver modes.

* * * * *